April 25, 1967 R. L. PROPST 3,315,753
CROP THINNER
Original Filed April 29, 1964

INVENTOR.
ROBERT L. PROPST
BY
ATTORNEYS

United States Patent Office 3,315,753
Patented Apr. 25, 1967

3,315,753
CROP THINNER
Robert L. Propst, Ann Arbor, Mich., assignor to Herman Miller, Inc., Zeeland, Mich., a corporation of Michigan
Continuation of application Ser. No. 363,451, Apr. 29, 1964. This application July 14, 1965, Ser. No. 475,311
2 Claims. (Cl. 172—96)

This application is a continuation of my co-pending application Ser. No. 363,451, filed Apr. 29, 1964, now abandoned, and entitled, Crop Thinner.

This invention relates to apparatus for thinning plants from a crop row. More particularly, this invention relates to such an apparatus which utilizes a small, lightweight rotary cutting member which is selectively raised or lowered for respectively saving or destroying plants in the crop row.

Many types of apparatus are presently in existence for thinning plants from crop rows. Many crops planted in rows must be thinned in order to assure the best harvest potential. Even with the great variety of complex machines proposed to accomplish crop thinning, most of this work must still be done by hand. Consequently, this operation has become gradually more expensive as the cost of hand labor has gone up. With respect to crops such as sugar beets, the thinning operation has become the single most expensive operation. This is true also with respect to certain other crops.

Additionally, thinning often requires a laborer to crawl on hands and knees along the crop row using a short handled hoe in order to do the precise job necessary for good thinning. This kind of work is unusually fatiguing and extremely unpleasant. The many attempts made to develop mechanical thinners usually include a structure for cutting out a set interval of plants in the row, and leaving a set interval, supposedly leaving only a single plant. This approach has not proven satisfactory because plants are invariably randomly spaced in a crop row. Consequently, mechanically spaced thinners are as likely to leave a blank space between plants as they are a single plant. At other times, doubles or triples are likely to be left. Also, crop thinners which have been proposed in the past have been extremely cumbersome and complex, and therefore simply not adapted for the delicate job of thinning a crop row. Such ponderous machinery and the excess energy with which they operate have in fact proven undesirable.

It is an object of this invention to provide an improved apparatus for thinning plants from a crop row utilizing a small, lightweight rotary cutter for destroying plants to be thinned from the crop row.

A further object of this invention is the provision of such an apparatus which utilizes lightweight, wirelike elements extending from a rotating hub, the structure rotating in a plane perpendicular to the crop row as the apparatus moves therealong, the apparatus lowered into the crop row for destruction of plans and raised therefrom when a plant is to be saved.

A further object of this invention is the provision of such an apparatus, the inherent operation of which enables the structure to be simplified, yet effective in operation.

A further object of this invention is the provision of such an apparatus which requires much less power for operation than structures presently in existence.

These and other objects of this invention will become apparent to those skilled in the relevant arts upon reading the following specification in conjunction with the accompanying drawings, wherein.

Briefly, this invention relates to an apparatus for thinning plants from a crop row having a frame movable in a direction along a crop row. A cutting member is provided, rotatably supported on the frame for rotation about an axis generally parallel to the crop row. Powered means are provided for rotation of the cutting member, a plurality of elongated elements extending from the cutting member and adapted for rotation in a plane generally perpendicular to the crop row. Means are provided for raising and lowering this cutting member from the crop row for respectively selectively saving or destroying plants therein.

Figure 1:
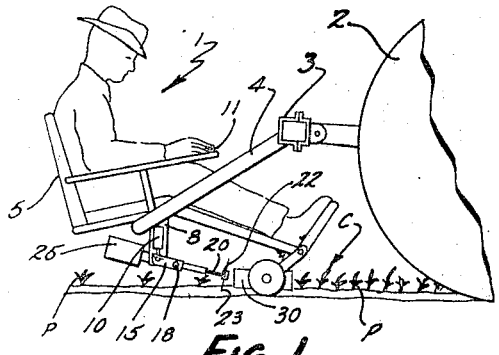
FIG. 1 is a side view of a crop thinning apparatus embodying the teachings of this invention, positioned to remove plants from a crop row.

Referring more specifically to the drawing, the reference numeral 1 designates the crop thinning apparatus of this invention (FIG. 1). The apparatus 1 is mounted on a crossbar 3 supported on a tractor 2 and includes a frame 4 adapted for movement in a direction along a crop row. In the embodiment shown, a seat 5 is mounted on the frame 4 for carrying an operator. However, it is to be understood that the apparatus is also well adapted to be automated and the invention is not limited to the requirement of a riding operator.

Figure 2:
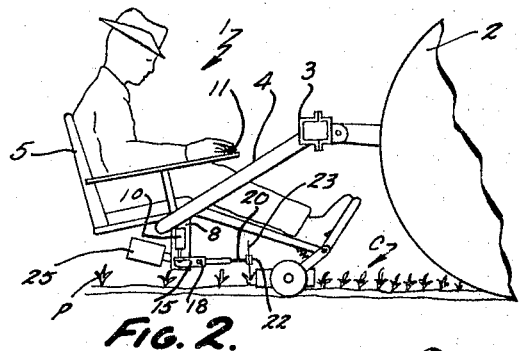
FIG. 2 is a view similar to FIG. 1, the apparatus positioned to save a plant in the crop row.
Figure 3:
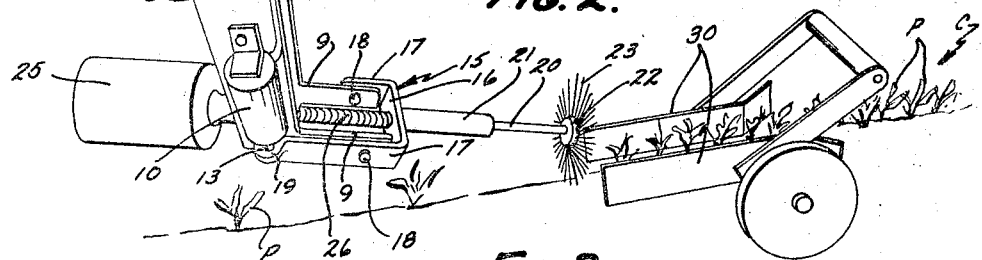
FIG. 3 is an enlarged, plan, perspective view of the plant removing apparatus.

An arm 8 extends downwardly from the frame 4, terminating with a pair of generally horizontal sections 9 (FIG. 3.) A solenoid actuator 10, of standard construction and well-known to various arts, is mounted on the arm 8. The actuator 10 is operably connected to a button 11 (FIGS. 1 and 2) by means of the wires 12, whereby movement of the button 11 operates the actuator to move the driving element 13 up and down (FIG. 3). The bracket 15, of generally U-shape and including a bight portion 16 and a pair of legs 17, is pivotally mounted on the horizontal sections 9 by means of pins 18 extending through the legs 17 of the bracket. The driving element 13 is operably secured to the ear 19 of one of the legs 17 of bracket 15. It will now be seen that operation of the button 11 moves the bight portion 16 of the bracket 15 vertically through the actuator 10 as the bracket 15 pivots about the pins 18.

Figure 4:
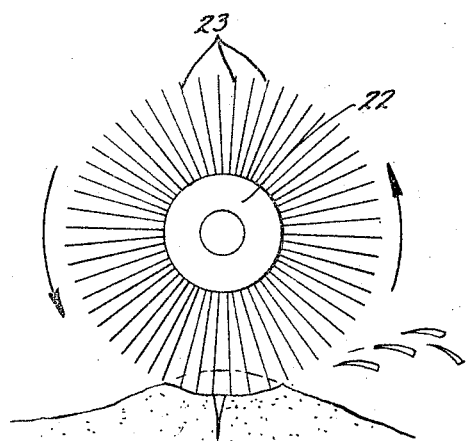
FIG. 4 is a front view of the cutting member of this invention.

Shaft 20 is mounted for rotation within the collar 21 associated with the bight portion 16 of the bracket 15. Shaft 20 is rotatable about an axis generally parallel to the crop row C. At one end of the shaft 20 a hub 22 is mounted. A plurality of wirelike elements 23 extend from the hub 22 and it will be noted that the elements 23 are adapted for rotation in a plane generally perpendicular to the crop row. The wire elements 23 are elongated and slightly flexible, closely spaced to one another as shown in FIG. 4. A high r.p.m. electric motor 25 is mounted on the arm 8 for rotation on the shaft 20, the power to this motor easily supplied by the tractor generator or a separate power take-off from the generator. In the embodiment shown, the shaft 20 includes a flexible coupling 26. Thus, through the motor 25, the shaft 20 and the hub 22 continuously rotate, the wire elements 23 passing through the crop row C at high speed when the button 11 is depressed (FIG. 1), the wire elements lifted from the crop row when the button 11 is released (FIG. 2), the bracket 15 pivoting about the sections 9 and raising the shaft. Shields 30 are supported by the frame 4 just in front of the rotary cutter 22.

The device operates as follows. The tractor 2 moves along the crop row C containing a plurality of closely spaced plants P, the frame 4 supporting the operator above the crop row on seat 5. Until the operator depresses the button 11 associated with the seat 5, the solenoid actuator 10 pivots the bracket 15 about the pins 18, lowering the shaft 20 and thus the rotary hub 22 to a position where the wirelike elements 23 tear into the crop row. The flexible wire elements 23 rotate at very high spped and completely destory plants P in the crop row C as the apparatus moves therealong. The rotary action in a plane perpendicular to the crop row assures complete destruction of all plants in the row. Due to the nature of the elements 23, the device is completely self-cleaning as the elements throw all materials therefrom (FIG. 4). When the operator presses the button 11, the actuator 10 pivots the bight portion 16 of the bracket 15, upwardly, pivoting the shaft 20 and the hub 22 upwardly, thereby removing the wire elements 23 from the crop row. When this is done, a plant P is saved in the crop row. Due to the inherent structure of the apparatus 1, the cutting member can be instantaneously moved into or out of the crop row C. The elements 23 move at high speed constantly, yet the actuator 10 can move the shaft 20, hub 22 and elements 23 with ease and great speed, the flexible coupling assisting in this operation.

It will be seen that this invention has provided a vastly improved crop thinning apparatus. The parts involved are lightweight and the entire apparatus is free of cumbersome, heavy parts. Yet, plants are removed from the crop row with great effectiveness and very little power is required to achieve mechanical movements required due to the inherent structure of the apparatus when compared with conventional crop thinning structures.

While only one embodiment of this invention has been shown and described, it may be possible to practice the invention through the utilization of certain other embodiments without departing from the spirit and scope thereof. Such other embodiments are to be included as part of this invention unless the following claims specifically state otherwise.

I claim:

1. An apparatus for thinning plants from a crop row, comprising: a frame movable in a direction along a crop row; a cutting member; said cutting member comprising a hub mounted on a shaft supported in a bracket for rotation about an axis generally parallel to the crop row; said bracket being generally U-shaped, the bight portion thereof rotatably supported said shaft; powered means supported on said frame for continuous rotation of said shaft and said cutting member; a plurality of elongated elements extending from said cutting member adapted for rotation in a plane generally perpendicular to the crop row, said elements being wire-like and closely spaced to one another on said hub; said bracket pivotally secured to said frame; said shaft including a flexible coupling; and solenoid actuated means pivoting said bracket for raising and lowering said cutting member from the crop row for respectively selectively saving or destroying plants therein, said solenoid actuated means pivotally connected to a leg of said bracket.

2. An apparatus for thinning plants from a crop row, comprising a frame movable in a direction along a crop row; a cutting member; said cutting member comprising a hub mounted on a shaft supported in a bracket for rotation about an axis generally parallel to the crop row; said bracket being generally U-shaped, the bight portion of said bracket rotatably supporting said shaft; powered means supported on said frame for continuous rotation of said shaft and said cutting member; a plurality of elongated elements extending from said cutting member adapted for rotation in a plane generally perpendicular to the crop row, said elements being wire-like and closely spaced to one another on said hub; said bracket pivotally secured to said frame, said shaft including a flexible coupling; and means associated with said bracket for pivoting said bracket for raising and lowering said cutting member from the crop row for respectively selectively saving or destroying plants therein.

References Cited by the Examiner

UNITED STATES PATENTS

| 1,383,528 | 7/1921 | Clarke | 172—543 |
| 1,743,195 | 1/1930 | Ditlevsen | 172—125 X |
| 2,177,803 | 10/1939 | Ferte et al. | 172—6 |
| 2,592,689 | 4/1952 | Hann | 172—6 |
| 2,737,105 | 3/1956 | Wilson | 172—15 |
| 3,169,583 | 2/1965 | Thurow | 172—543 X |

FOREIGN PATENTS

| 1,172,823 | 10/1958 | France. |
| 1,207,955 | 9/1959 | France. |
| 832,554 | 4/1960 | Great Britain. |

ABRAHAM G. STONE, *Primary Examiner.*

F. B. HENRY, R. L. HOLLISTER, *Assistant Examiners.*